United States Patent [19]

Ichiba

[11] Patent Number: 5,227,966
[45] Date of Patent: Jul. 13, 1993

[54] DATA PROCESSING APPARATUS FOR SALES TRANSACTIONS

[75] Inventor: Hirotaka Ichiba, Shizuoka, Japan

[73] Assignee: Tokyo Electric Co., Ltd., Tokyo, Japan

[21] Appl. No.: 534,432

[22] Filed: Jun. 7, 1990

[30] Foreign Application Priority Data

Jun. 9, 1989 [JP] Japan .................................. 1-147015

[51] Int. Cl.$^5$ .............................................. G06F 15/20
[52] U.S. Cl. .................... 364/405; 364/568; 177/25.15
[58] Field of Search ........ 364/405, 401, 400, 568–569; 902/11, 13, 14, 22, 40; 194/215, 216, 217, 220, 219, 260, 339; 235/7 A, 23, 375, 378, 425; 177/25.11, 25.12, 25.13, 25.14, 25.15, 51

[56] References Cited

U.S. PATENT DOCUMENTS

| | | | |
|---|---|---|---|
| 3,705,384 | 12/1972 | Wohlberg | 340/149 |
| 4,070,564 | 1/1978 | Tucker | 364/405 |
| 4,191,999 | 3/1980 | Kashio | 364/405 |
| 4,522,275 | 6/1985 | Anderson | 177/25 |
| 4,532,641 | 7/1985 | Nishimura | 377/14 |
| 4,817,041 | 3/1989 | Sakamoto | 364/405 |
| 5,036,966 | 8/1991 | Kaspar | 194/217 |

FOREIGN PATENT DOCUMENTS

| | | |
|---|---|---|
| 0090894 | 10/1973 | European Pat. Off. |
| 2582840 | 3/1987 | France |
| 58-172522 | 10/1983 | Japan |
| 62-238422 | 10/1987 | Japan |

Primary Examiner—Roy N. Envall, Jr.
Assistant Examiner—A. Bodendorf
Attorney, Agent, or Firm—Frishauf, Holtz, Goodman & Woodward

[57] ABSTRACT

A sales transaction apparatus includes a weighing section for measuring the weight of a coin, a memory section for storing the weight data of plural types of coins, and a processing section for determining the types and numbers of coins to be paid back as a change amount. A total weight of the coins is obtained as a sum by multiplying the numbers of coins by the weights read out in correspondence with the types of coins, and the total weight is checked against a weight data obtained from the weighing section in correspondence with the coins to be actually paid back as the change amount.

10 Claims, 11 Drawing Sheets

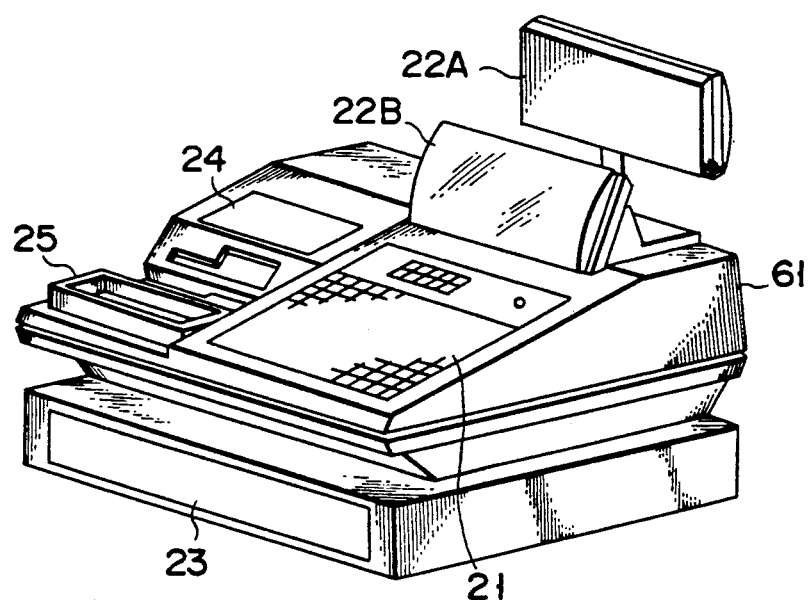
F I G. 1
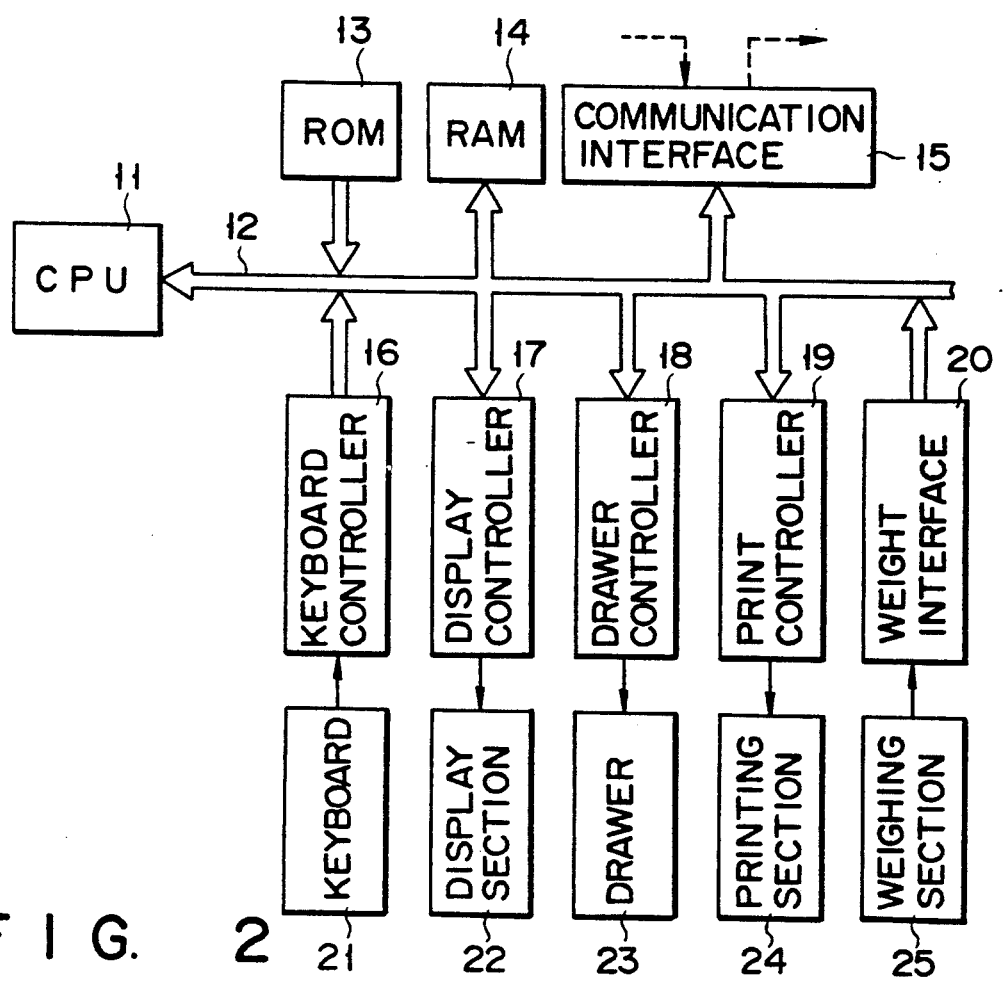
F I G. 2

| WEIGHT REGISTERS | FACE VALUE REGISTERS | PIECE REGISTERS | TOTAL AMOUNT REGISTERS |
|---|---|---|---|
| M1 | 1 | C1 | C1×1 |
| M2 | 5 | C2 | C2×5 |
| M3 | 10 | C3 | C3×10 |
| M4 | 50 | C4 | C4×50 |
| M5 | 100 | C5 | C5×100 |
| M6 | 500 | C6 | C6×500 |
WR1-WR6    FR1-FR6    NR1-NR6    TR1-TR6
F I G. 3
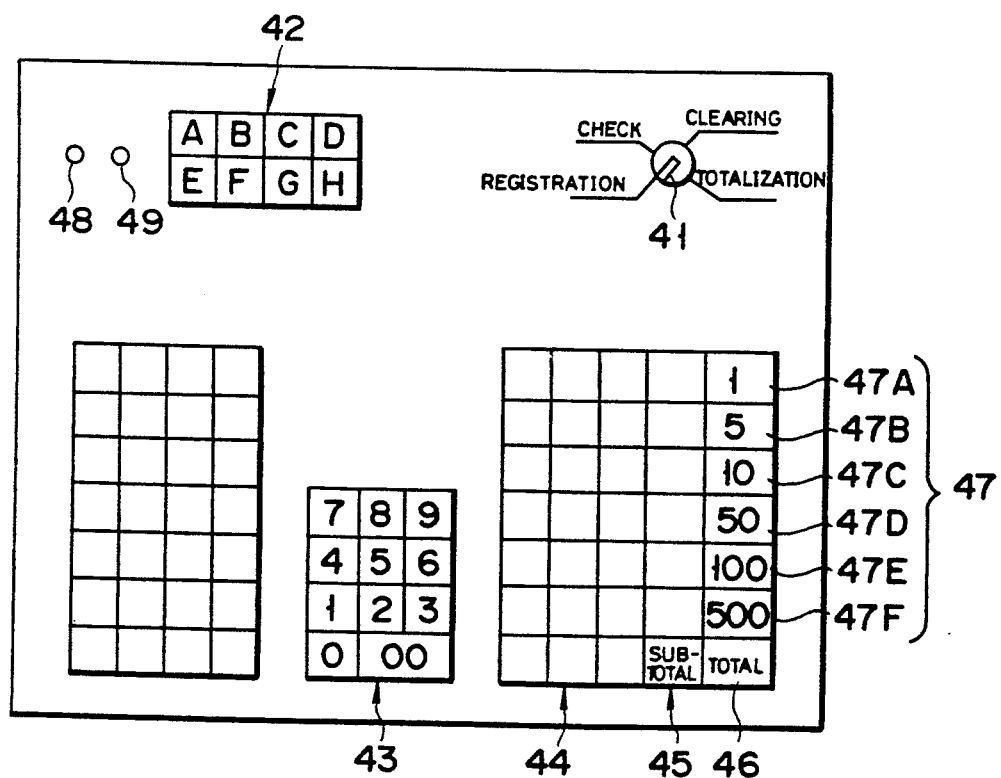
F I G. 4

```
       TOTALS
        SLIP 89 05 12 FRI #0

341 PCS.
  ¥1 COINS         ¥341
    91 PCS.
  ¥5 COINS         ¥455
    76 PCS.
  ¥10 COINS        ¥760
    85 PCS.
  ¥50 COINS       ¥4,250
    71 PCS.
  ¥100 COINS      ¥7,100
    47 PCS.
  ¥500 COINS     ¥23,500
   TOTAL         ¥36,406
```

F I G.   7

| WEIGHT REGISTERS | FACE VALUE REGISTERS | PIECE REGISTERS | TOTAL AMOUNT REGISTERS | RANGE REGISTERS |
|---|---|---|---|---|
| M1 | 1 | C1 | C1×1 | M1−β1~M1+α1 |
| M2 | 5 | C2 | C2×5 | M2−β2~M2+α2 |
| M3 | 10 | C3 | C3×10 | M3−β3~M3+α3 |
| M4 | 50 | C4 | C4×50 | M4−β4~M4+α4 |
| M5 | 100 | C5 | C5×100 | M5−β5~M5+α5 |
| M6 | 500 | C6 | C6×500 | M6−β6~M6+α6 |
| WR1−WR6 | FR1−FR6 | NR1−NR6 | TR1−TR6 | RR1−RR6 |

FIG. 9

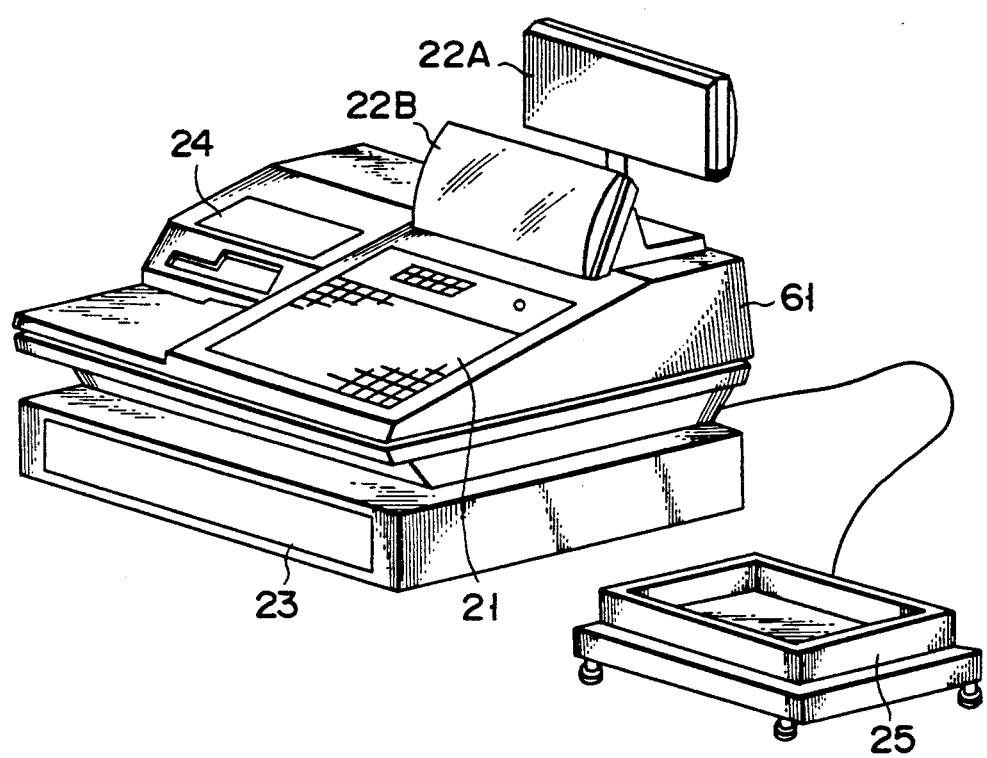
F I G. 11

DATA PROCESSING APPARATUS FOR SALES TRANSACTIONS

BACKGROUND OF THE INVENTION

1. Field of the Invention

The present invention relates to a data processing apparatus used for sales transactions requiring handling of coins.

2. Description of the Related Art

Electronic cash registers have been used to register cash for sold items in a lot of supermarkets. A cashier registers cash for the sold items, calculates a total amount of the sold items, and charges the total amount to a customer. When the customer tenders an amount exceeding the charged total amount, the cashier takes out cash as a difference between the tendered amount and the charged amount from a drawer of the cash register and hands it as change to the customer.

The drawer of the cash register is partitioned into a plurality of cash compartments for respectively storing coins and bills of predetermined denominations so as to allow the cashier to pick up a desired amount of change. In general, although the cashier carefully checks the number and denomination of bills before they are paid back as a change to the customer, coins as the auxiliary currency are not carefully handled as compared with the bills because a total amount of coins as change is not so large in most sales transactions.

For example, when there are a lot of customers who wait in a line to pass through a cashier counter after the cashier stores the cash from one customer into the compartments, she or he must immediately register cash for the next customer. In particular, coins tend to be mixed with coins already stored in the compartments. Even if coins are stored in a wrong compartment, the cashier may not notice it. The coins in the wrong compartment may be paid back to customers as coins which are supposed to be stored in other compartments.

In recent years, various consumption taxes have been introduced to cover various sales transactions, and a charged amount usually includes a fraction corresponding to the consumption tax added to the price of an item. As a result, cashiers are more frequently handling coins as small change, and it is estimated that settlement errors are correspondingly increasing.

SUMMARY OF THE INVENTION

It is an object of the present invention to provide a data processing apparatus for sales transactions which allows easy handling of coins.

In order to achieve the above object of the present invention, there is provided a data processing apparatus for sales transactions, comprising a weighing section for weighing coins, a memory section for storing weight data of plural types of coins, and a processing section for determining types and numbers of required coins, producing a total weight of the coins as a sum obtained by multiplying the numbers of coins by the weight data read out in correspondence with the types of coins, and checking whether the total weight coincides with an item of weight data obtained from the weighing section in correspondence with the coins actually prepared.

According to this apparatus, when coins to be paid back to a customer are required as a change, the types and numbers of coins to be paid back are determined to correspond to a change amount, and the total weight of the coins as the change is obtained on the basis of the coin weights stored in the memory section. Finally, the processing section checks whether the total weight of the coins coincides with the weight obtained from the weighing section in correspondence with the coins actually prepared for the change. If a coincidence is not established, the types or numbers of coins have an error. Therefore, change calculation errors caused by insufficient check of coins can be prevented beforehand.

BRIEF DESCRIPTION OF THE DRAWINGS

FIG. 1 is a perspective view showing the outer appearance of an electronic cash register according to the first embodiment of the present invention;

FIG. 2 is a block diagram of a circuit arrangement of the electronic cash register shown in FIG. 1;

FIG. 3 is a table showing a register set assigned in part of a RAM shown in FIG. 2;

FIG. 4 is a plan view showing a detailed arrangement of a keyboard shown in FIG. 2;

FIG. 7 is a plan view showing a slip issued during weighing of coins collected as a sales amount;

FIGS. 9 and 10 are a table showing RAM contents and a flow chart for a totalizing mode, respectively, and which are used for explaining an electronic cash register according to the second embodiment similar to the first embodiment; and FIG. 11 is a perspective view showing a modification of the first and second embodiments, wherein the weighing section is partially separated from an electronic cash register body.

DETAILED DESCRIPTION OF THE PREFERRED EMBODIMENTS

Figure 5:
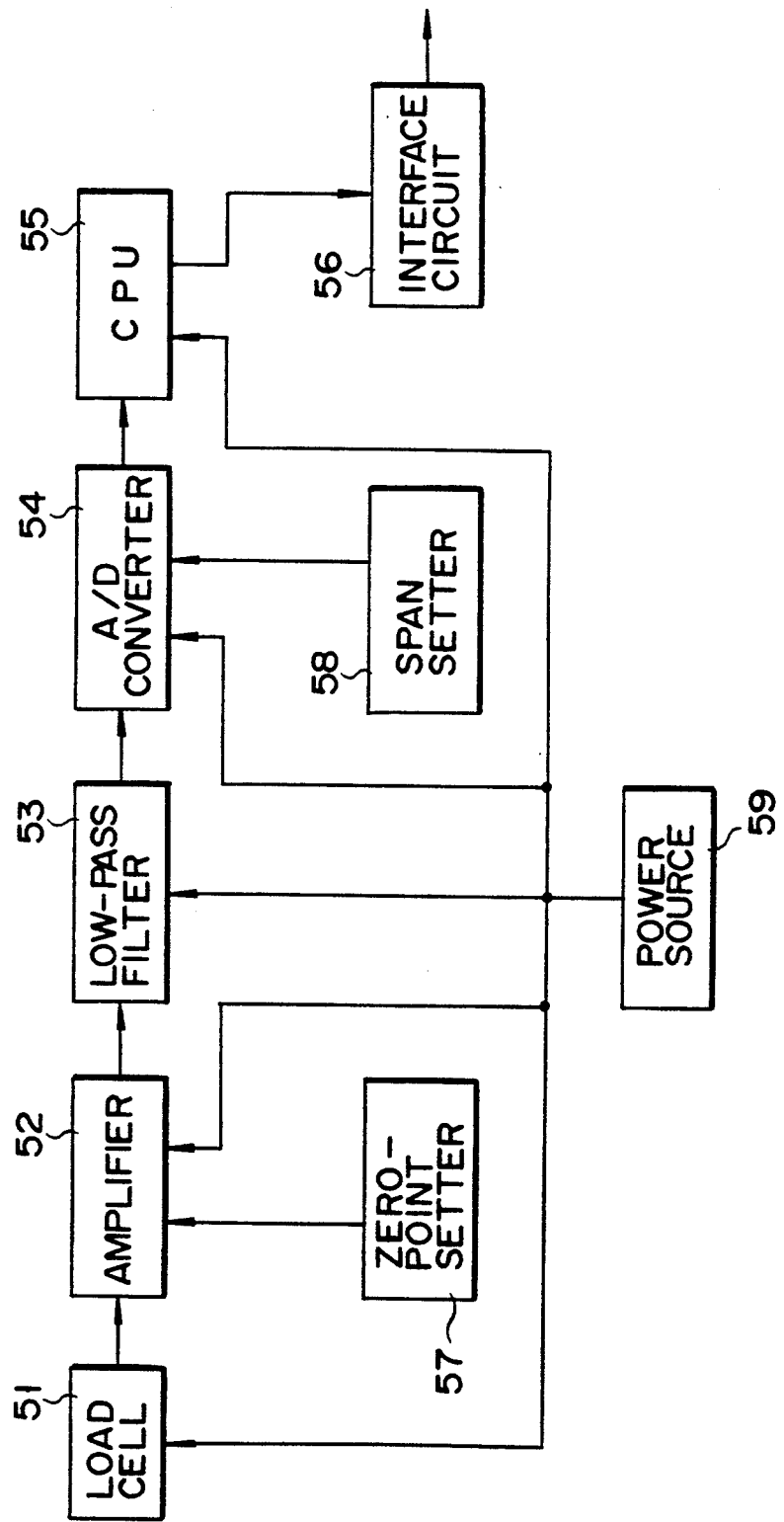
FIG. 5 is a diagram showing a circuit arrangement of a weighing section shown in FIG. 2.

An electronic cash register according to the first embodiment of the present invention will be described with reference to FIGS. 1 to 8.

FIG. 1 shows the outer appearance of this electronic cash register, and FIG. 2 shows its circuit arrangement. This electronic cash register is installed as a POS (Point of Sales) terminal, e.g., on a floor of a supermarket. The electronic cash register comprises a CPU 11, a ROM 13, a RAM 14, a communication interface 15, a keyboard controller 16, a display controller 17, a drawer controller 18, a print controller 19, and a weight interface 20. These circuit elements are connected to each other through bus lines 12 consisting of address, data, and control buses. The controllers 16, 17, 18, and 19 are connected to a keyboard 21, a display section 22, a drawer 23, and a printing section 24, respectively. The weight interface 20 is connected to a weighing section 25.

The ROM 13 stores control programs for the CPU 11. Upon execution of the control programs stored in the ROM 13, the CPU 11 performs operations in the registration, check, clearing, or totalizing mode. The RAM 14 stores data input and output from the CPU 11 in these operations. The communication interface 15 is used to control data communication with a host computer installed in an office to manage various job files. For example, an inquiry about, e.g., prices of items, and a transaction report are performed through the communication interface 15. The controller 16 controls the keyboard 21 and supplies key input data from the keyboard 21 to the CPU 11. The controller 17 controls the display section 22 to cause display data from the CPU 11 to be displayed on the display section 22. The controller 18 controls the drawer 23 to open the drawer 23 in response to an open request supplied from the CPU 11. The controller 19 controls the printing section 24 to cause printing data supplied from the CPU 11 to be printed at the printing section 24. The weight interface 20 supplies the weight data from the weighing section 25 to the CPU 11.

FIG. 3 shows a register set assigned to part of the RAM 14. This register set includes weight registers WR1 to WR6, face value registers FR1 to FR6, piece registers NR1 to NR6, and total amount registers TR1 to TR6 respectively corresponding to six types of auxiliary currency means, i.e., 1, 5, 10, 50, 100, and 500 coins. The weight registers WR1 to WR6 store coin weights M1, M2, M3, M4, M5, and M6, respectively. The face value registers FR1 to FR6 store coin face values "1", "5", "10", "50", "100", and "500", respectively. The piece registers NR1 to NR6 store coin counts C1, C2, C3, C4, C5, and C6, respectively. The total amount registers TR1 to TR6 are used to store total amounts "C1×"1"", "C2×"5"", "C3×10", "C4×50", "C5×100", and "C6×500" obtained by multiplying the coin face values with the counts, respectively. The contents of the piece registers NR1 to NR6 and the total amount registers TR1 to TR6 are updated in totalizing and registration operations.

FIG. 4 shows a detailed arrangement of the keyboard 21. The keyboard 21 includes a mode switch 41, eight cashier buttons 42, 11 numeric keys 43, 27 department keys 44, a subtotal key 45, a total key 46, and six coin designation keys 47. The mode switch 41 is used to select a registration, check, clearing, or totalizing mode. The cashier buttons 42 are used to register himself or herself as a person in charge assigned to one of operators A to H for the electronic cash register. The numeric keys 43 consist of the "0", "00", and "1", "2", . . ., "9" keys. The coin designation keys 47 consist of keys 47A to 47F for respectively 1, 5, 10, 50, 100, and 500 coins. The keyboard 21 also includes an error indicator lamp 48, and an "OK" indicator lamp 49.

The registration mode is selected to calculate the price of each item and a total amount of items to be registered per customer, register sales data including item information, e.g., a sold item name and count in addition to the total amount in the RAM 14, and print the sales data on a receipt and a journal. The check mode is selected to print a total sales amount and a total sold item count which are obtained from the sales data registered in the registration mode so as to check the sales conditions. The clearing mode is selected to print all sales data at the end of, e.g., a day and clear the contents of the RAM 14. The totalizing mode is selected to calculate the total amount from the weight of coins weighed by the weighing section in units of denominations at the time of collection of the sales amount and to display the total amount.

As shown in FIG. 5, the weighing section 25 comprises a load cell 51, an amplifier 52, a low-pass filter 53, an A/D converter 54, a CPU 55, an interface circuit 56, a zero-point setter 57, a span setter 58, and a power source 59 for supplying power to the above components. When a coin is placed on the load cell 51, a voltage signal corresponding to its weight is generated by the load cell 51. This voltage signal is amplified by the amplifier 52, and the amplified signal is converted into a digital signal by the A/D converter 54 through the low-pass filter 53. This digital signal is supplied to the CPU 55 and is converted into weight data in units of grams. The weight data i then supplied to a device outside the weighing section 25, i.e., the interface 20 shown in FIG. 2 through the interface circuit 56.

In this embodiment, as shown in FIG. 1, the weighing section 25 is incorporated in a case 61 of an electronic cash register and is located to the left of the keyboard 21 above the drawer 23 in the front portion of the case 61. Referring to FIG. 1, a display section DS is constituted by a customer display DSA and an operator display DSB.

Operations of the electronic cash register of this embodiment will be briefly described below. The operations of this electronic cash register are performed in the same manner as in the conventional cash register in the check and clearing modes. However operations in the registration and totalizing modes of the electronic cash register of this embodiment are performed as follows.

The registration mode is set when the mode switch 41 is set in the "registration" position. In the registration mode, when a tendered amount is subtracted from a charged amount as the total amount of sold items and a difference occurs to be payed back as a change, the electronic cash register determines the types and numbers of coins so as to present a smallest number of coins corresponding to the change and displays these types and numbers. The types of coins are selected from 1, 5, 10, 50, 100, and 500 coins, and the counts C1 to C6 of these different types of coins are determined.

The counts C1 to C6 are multiplied with the weights M1 to M6, and the products are added to each other to obtain a total coin weight M. This total weight M is compared with weight data MS obtained by causing the weighing section 25 to weigh the actually prepared coins corresponding to the displayed types and numbers of coins. If a coincidence is established, the "OK" indicator lamp 49 is turned on. Otherwise, the error indicator lamp 48 is turned on.

The totalizing mode is set when the mode switch 41 is set at the "totalizing" position. In the totalizing mode, when any one of the coin designation keys 47A to 47F is operated, the type of coins measured by the weighing section 25 is designated. The designated coins are placed on the weighing section 25, and weight data corresponding to the designated coins is obtained from the weighing section 25. In order to obtain a count Cn (n=1, 2, ... 6), the weight data MS is divided by the weight Mn. The count Cn is multiplied with the face value of the coin so that a total amount of designated coins can be obtained.

Figure 6:
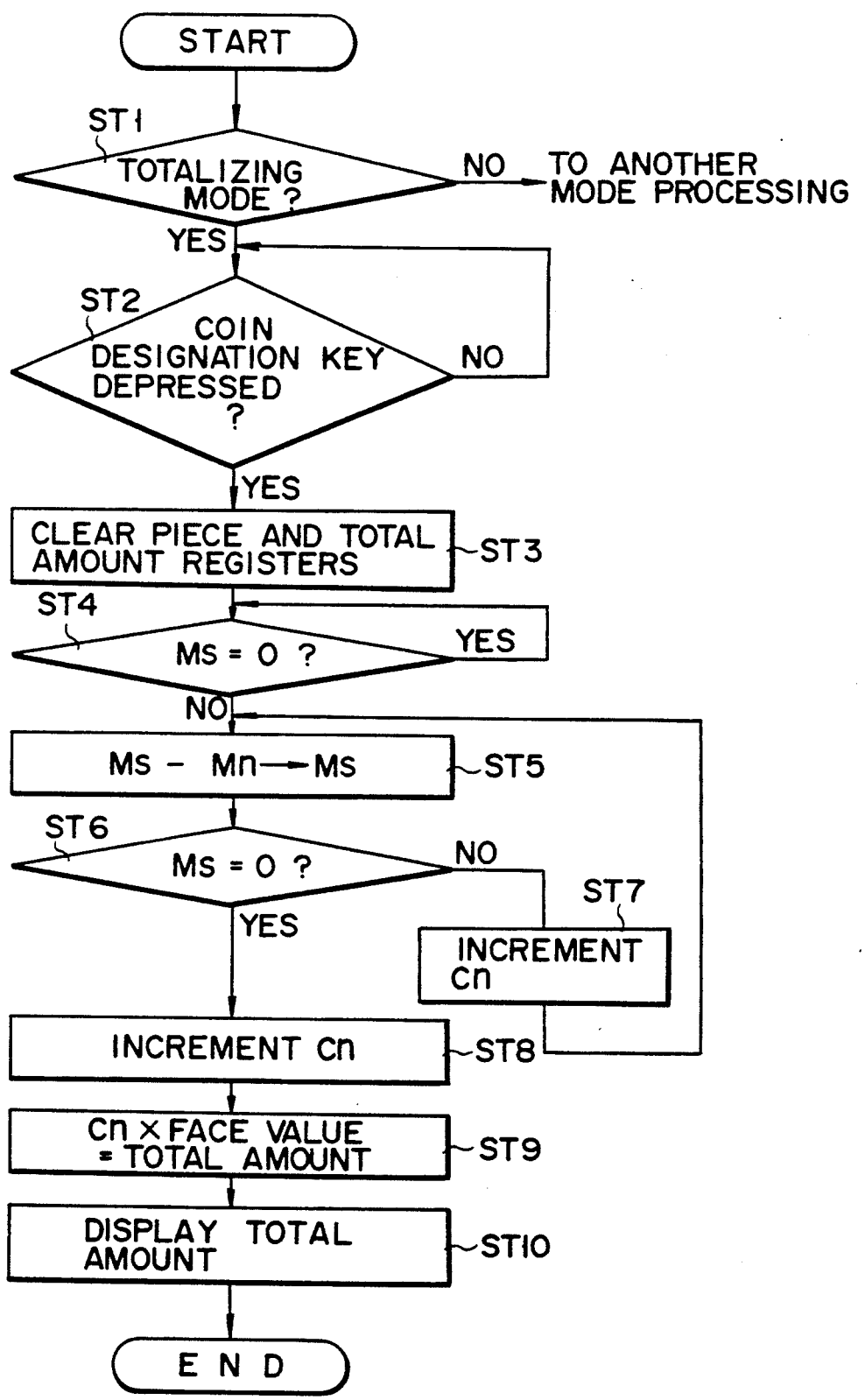
FIG. 6 is a flow chart showing a totalizing mode of the electronic cash register.
Figure 8A:
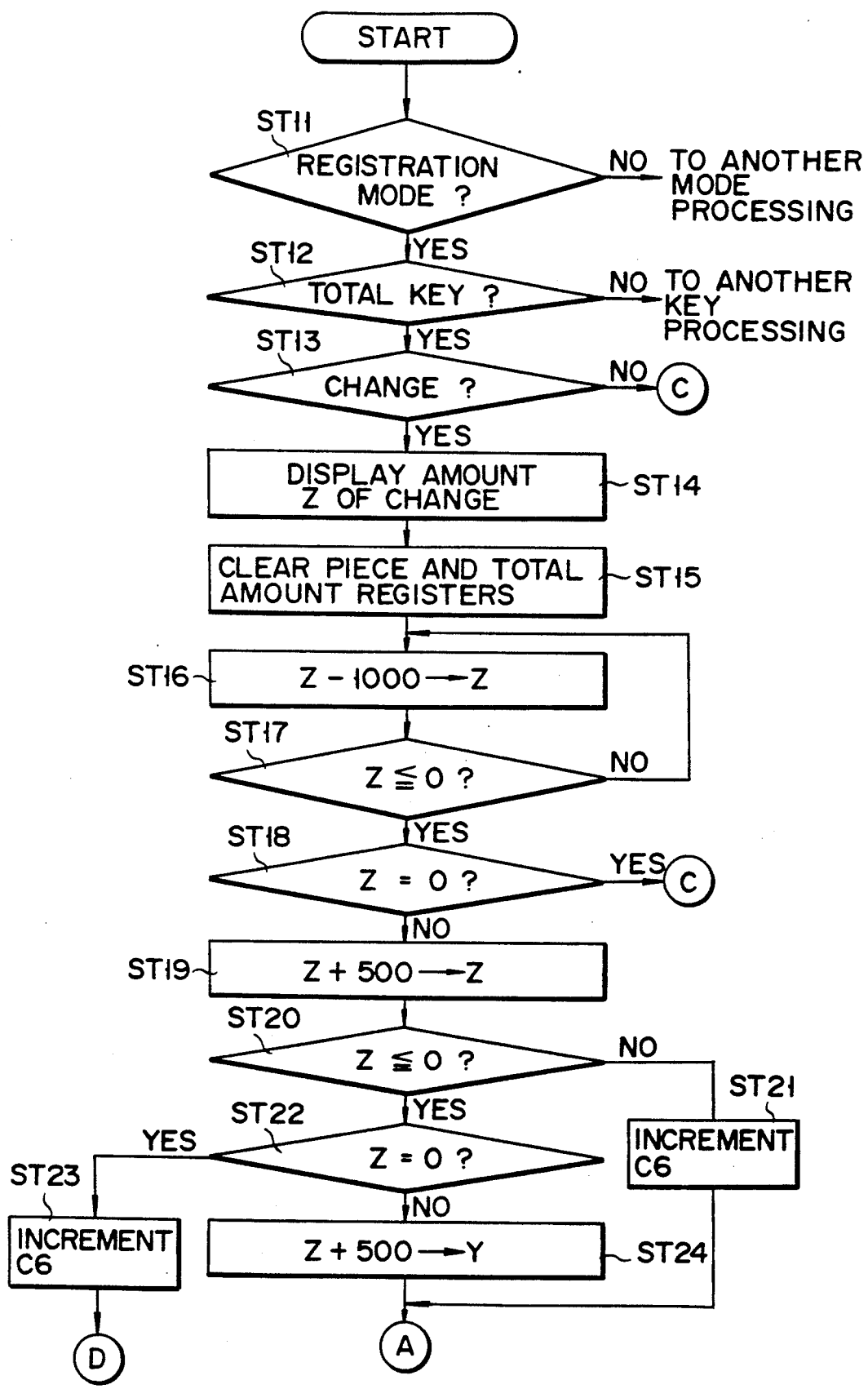
FIGS. 8A, 8B and 8C are flow charts for a registration mode of the electronic cash register.
Figure 8B:
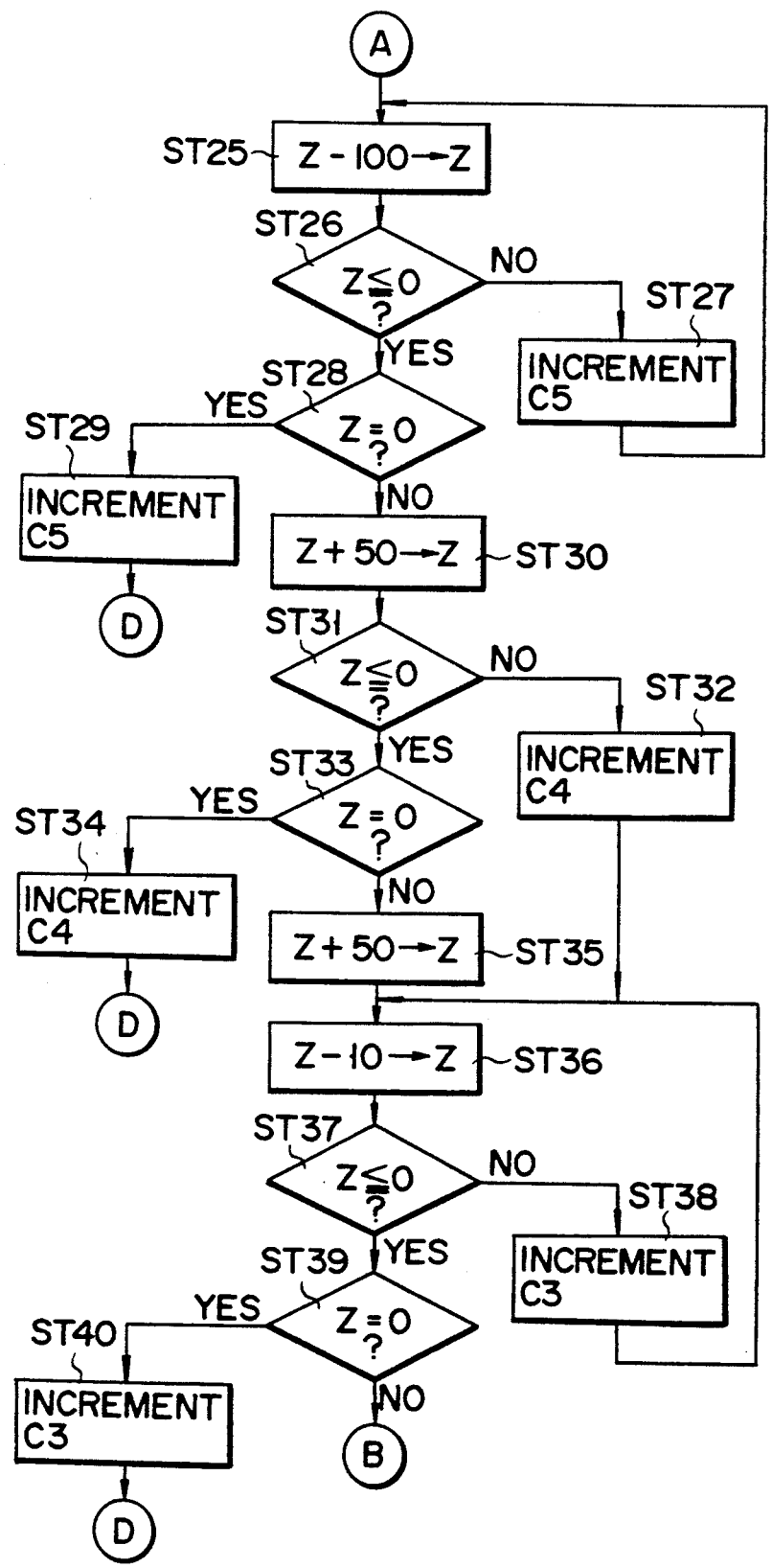
Figure 8C:
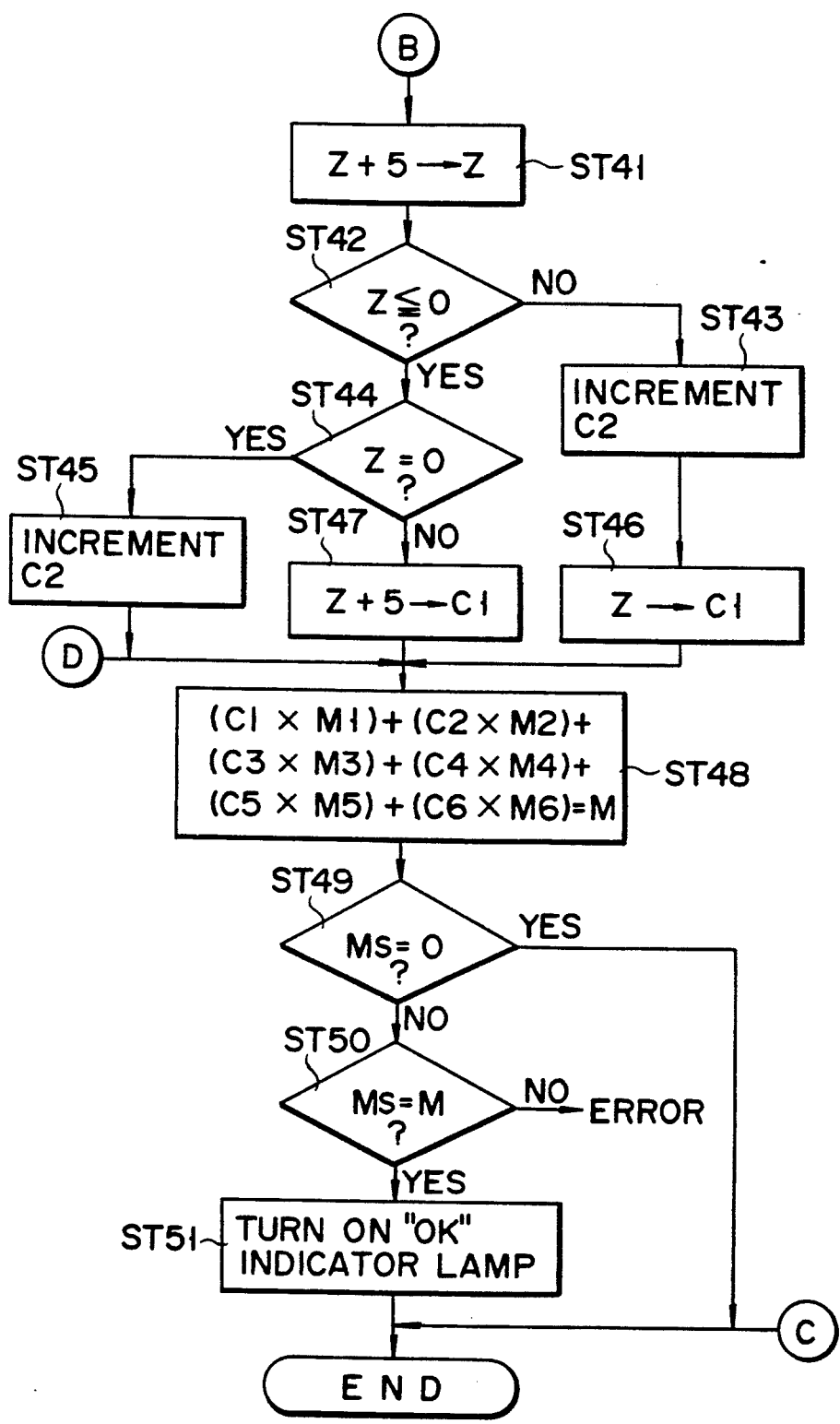

FIG. 6 is a flow chart showing an operation in the totalizing mode, and FIGS. 8A to 8C are flow charts for explaining an operation in the registration mode.

The characteristic operations in these modes will be described with reference to these flow charts. [Totalizing Mode]

In order to collect the sales amount, the mode switch 41 is set in the "totalizing" position. After one of the coin designation keys 47A to 47F is depressed in correspondence with the type of coins included in the total sales amount, the designated coins are placed on the weighing section 25.

The CPU 11 detects in step ST1 that the mode switch 41 is set in the "totalizing" mode, and then in step ST2 that one of the coin designation keys 47A to 47F is depressed. The piece register NRn and the total amount register TRn corresponding to the designated coin are cleared in step ST3. The CPU 11 checks in step ST4 if weight data MS from the weighing section 25 is "0".

When the weight data MS from the weighing section 25 is not zero, the weight Mn of the designated coin is subtracted from the weight data MS in step ST5, and the CPU 11 checks in step ST6 if the weight data Ms is zero. If NO in step ST6, the content of the piece register NRn of the designated coin is incremented in step ST7, and the operations in steps ST5 to ST7 are repeated until the weight data MS becomes zero in step ST6. When the weight data MS becomes zero in step ST6, the content of the piece register NRn is incremented in step ST8. At this time, the total count Cn of the coins placed on the weighing section 25 is stored in the piece register NRn.

In step ST9, the face value of the designated coin is multiplied with the count Cn to obtain a total amount, and the total amount is stored in the total amount register TRn. In step ST10, the total amount is displayed on the display section 22.

The above operations are repeated in units of coin denominations, and the total amounts of the respective types of coins are displayed on the display section 22, and, at the same time, are respectively stored in the total amount registers TR1 to TR6. For example, when the total key 46 is depressed, the counts C1 to C6 of all the types of coins, their amounts, and the total amount are printed out in a format shown in FIG. 7.

Registration Mode

In change amount check, when a change amount is displayed at the end of each sales transaction while the mode switch 41 is kept in the "registration" mode, the CPU 11 executes processing in accordance with the flow charts in FIGS. 8A to 8C.

When the CPU 11 detects in step ST11 that the registration mode is set and then in step ST12 that the total key 46 is depressed, the presence/absence of a change is checked in step ST13. When a change is required, an amount Z of change is displayed in step ST14. In step ST15, all the piece registers NR1 to NR6 and the total amount registers TR1 to TR6 are cleared. In step ST16, the amount Z is decreased in units of 1,000, and the operation in step ST16 is repeated until the amount Z becomes zero or less in step ST17. Coin counting is started when the amount Z becomes smaller than 1,000. When the count Z becomes zero or less in step ST17, the flow advances to step ST18 to check if the amount Z is zero. If YES in step ST18, the flow is ended. However, if NO in step ST18, the flow advances to step ST19 to add 500 to the amount Z. The flow then advances to step ST20 to check if the amount is zero or less. If NO in step ST20, the flow advances to step ST21 to increment the count C6 in the register NR6. If YES in step ST20, the count C6 is incremented in step ST23 if the amount Z is determined to be zero in step ST22. In steps ST18 to ST23, the count C6 as the number of 500 coins included in the amount of change is set in the register NR6.

Similarly, in steps ST24 to ST29, the count C5 as the number of 100 coins is counted and set in the register NR5. In steps ST30 to ST34, the count C4 as the number of 50 coins is counted and set in the register NR4.

Subsequently, in steps ST35 to ST40, the count C3 as the number of 10 coins is counted and set in the register NR3. In steps ST41 to ST45, the count C2 as the number of 5 coins is counted and set in the register NR2. Finally, in steps ST46 and ST47, the count C1 as the number of 1 coins is counted and set in the register NR1.

In step ST48, the counts C1 to C6 stored in the registers NR1 to NR6 are multiplied with the weights M1 to M6, respectively, and the products are added to obtain a total weight M of coins as a change to be paid back. That is,
$C1 \times M1 + C2 \times M2 + C3 \times M3 + C4 \times M4 + C5 \times M5 + C6 \times M6 = M$.

The CPU 11 checks in step ST49 if weight data MS from the weighing section 25 is zero. If YES in step ST49, the flow is ended when the change is not placed on the weighing section 25. When there is a low possibility of causing a cashier to erroneously pay the change, the change need not be placed on the weighing section 25 upon every payment, thus preventing degradation of working efficiency.

If NO in step ST49, i.e., the CPU 11 determines that the weight data MS is not zero, the CPU 11 checks in step ST50 if the weight data MS coincides with the total weight of the coins as a change to be paid back. If NO in step ST50, an error is detected and the error indicator lamp 48 is turned on. Otherwise, the "OK" indicator lamp 49 is turned on in step ST51.

According to this embodiment, when the designated coins are placed on the weighing section 25 after the denominations of the coins are classified and designated one by one, the total amounts of coins can be automatically calculated and displayed. Therefore, the total amounts of coins can be easily and quickly calculated in units of denominations.

When the total amounts of coins are calculated in units of denominations and then the total key 46 is depressed, and a total sales amount can be printed out on a journal together with the numbers of different coins and their total amounts, thereby easily and quickly totalizing the sales amount including coins.

When no change is paid in a sales transaction in the normal registration mode, the counts C1 to C6 of the coins included in the change are counted in accordance with a predetermined pattern. The counts C1 to C6 are multiplied with the weights M1 to M6, respectively, to calculate a total weight M corresponding to the change. If the total weight M does not coincide with the weight MS of coins placed on the weighing section 25, an error is indicated by turning on the error indicator lamp 48, thereby eliminating payment errors of coins included in the change.

Figure 10:
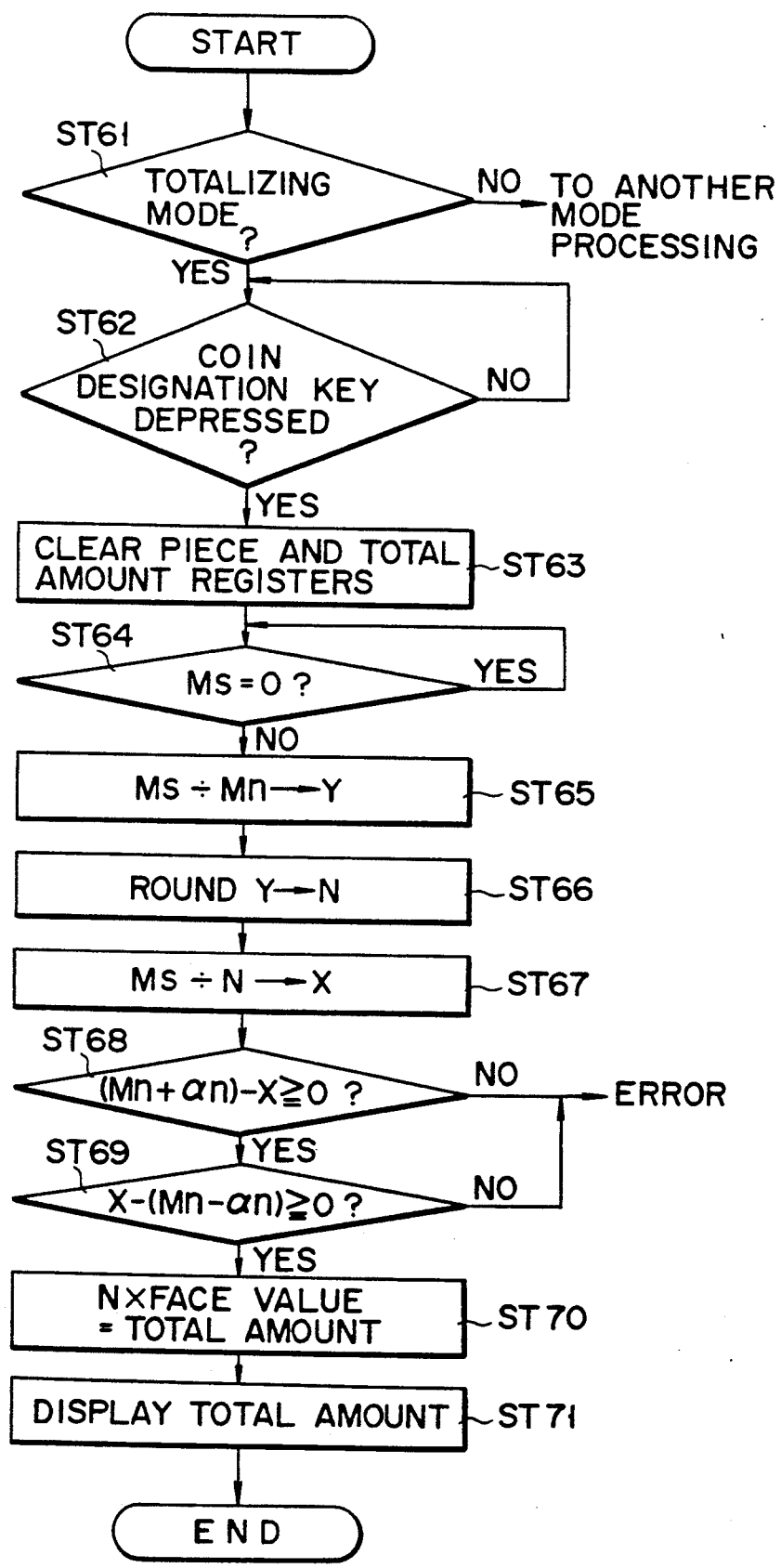

The second embodiment will be described with reference to FIGS. 9 and 10. The same reference numerals as in the first embodiment denote the same parts in the second embodiment, and a detailed description thereof will be omitted or simplified.

In calculations of the total amounts of coins in units of denominations, the total amounts will be calculated i consideration of variations in unit weights of coins in units of denominations. As compared with the first embodiment, the register set shown in FIG. 3 is changed to that shown in FIG. 9, and a CPU executes a flow chart in FIG. 10 in place of the processing shown in the flow chart of FIG. 6. Other arrangements and operation of the second embodiment are the same as those of the first embodiment.

Range registers RR1 to RR6 for storing variations in weights in units of denominations are added to the register set shown in FIG. 3. The range registers RR1 to RR6 store allowable lower limit values (M1−β1) to (M6−β6) and allowable upper limit values (M1+α1) to (M6+α6) of the weights M1 to M6 of the coins, respectively.

When a mode switch 41 is set in the "totalizing" position, the coin to be measured on a weighing section 25 is designated by one of coin designation keys 47A to 47F, and a count N of the designated coins is calculated in accordance with a weight Mn of the designated coin and weight data MS from the weighing section 25. The weight data MS from the weighing section 25 is divided by the count N to obtain a weight X per coin. A CPU 11 checks if the weight X falls within the allowable range, i.e., between the allowable upper and lower limit values. If the weight X falls within the allowable range, the total amount is calculated and displayed.

An operation of the second embodiment will be described with reference to the flow chart in FIG. 10.

The operations in steps ST61 to ST64 are the same as those in steps ST1 to ST4 in FIG. 6. When the weight data MS from the weighing section 25 is not zero in step ST64, the weight data MS is divided by the weight Mn of the designated coin to obtain a quotient Y in step ST65. Since the quotient Y includes a fraction, it is rounded to obtain a count N in step ST66.

The weight data MS from the weighing section 25 is divided by the count N to obtain an average weight X of each coin in step ST67. The CPU 11 checks in steps ST68 and ST69 if the weight X per coin falls within the allowable range, that is $$(Mn+\alpha n)-X \geq 0$$

$$X-(Mn-\beta n) \geq 0$$

If the checking result does not represent zero or more, it is processed as an error. That is, an error indicator lamp 48 is turned on.

However, if the checking result represents zero or more, the count N is multiplied with the corresponding face value to obtain a total amount, and this total amount is stored in a total amount register Trn. The total amount is displayed in step ST71.

According to the second embodiment, the average weight of each coin placed on the weighing section 25 is calculated. If the calculated weight falls within the allowable weight range, the total amount of the coins is obtained. For example, if a wrong coin is mixed or the coin designation keys 47A to 47F are erroneously operated, these can be detected. Therefore, the total amounts can be accurately calculated in units of denominations without any error.

In each embodiment, the weighing section 25 is arranged on the case 61 of the electronic cash register serving as a POS terminal. However, the weighing section 25 may be arranged as a separate unit, and the main case may be connected to the separate unit through a cable or the like.

Each embodiment exemplifies detection of coins but can be extended to bills.

In each embodiment, although the coin is designated by one of the coin designation keys 47A to 47F, the coin may be designated by a code input.

When the total weight M of the coins as a change obtained in calculations does not coincide with the weight data MS of the coins actually placed on the weighing section 25 in the first embodiment, and when the average weight of each coin placed on the weighing section 25 falls outside the allowable weight range, the error indicator lamp 48 is turned on. For example, however, a buzzer may be used in place of the error indicator lamp 48.

Though the present invention has been described with respect to Japanese currency, the present invention is equally applicable to various other world currencies. It should be understood that the present invention is not intended to the particular embodiments described above and shown in the drawings, and that various changes and modifications can be made without departing from the spirit and scope of the present invention as described in the following claims.

What is claimed is:

1. A data processing apparatus for sales transactions, comprising:
   memory means for storing weight data items representing unit weights of various types of coins;
   weighing means for weighing coins to detect a total weight thereof; and
   processing means, connected to said memory means and said weighing means, for performing processing of sales transactions; said processing means including:
   determining means for determining types and numbers of coins to be given as change,
   calculating means for calculating a reference total weight of the coins to be given as change, on the basis of the numbers of coins determined and the unit weights stored in said memory means and represented by weight data items corresponding to the types of coins determined, and
   checking means for checking that the reference total weight of the coins to be given as change coincides with the total weight of the coins detected by said weighing means.

2. A data processing apparatus according to claim 1, wherein said processing means further includes display means for displaying the types and numbers of the coins determined by said determining means.

3. A data processing apparatus according to claim 2, wherein said processing means further includes indicating means for indicating a result of the checking performed by the checking means.

4. A data processing apparatus according to claim 3, wherein said processing means includes means for disabling said indicating means until the total weight of the coins is detected by said weighing means.

5. A data processing apparatus according to claim 1, wherein said processing means further includes means for determining a type of each of a plurality of coins to be counted, and means for calculating a number of coins of the type determined, on the basis of the total weight of the coins detected by said weighing means and the unit weight represented by a corresponding one of the weight data items stored in said memory means.

6. A data processing apparatus according to claim 5, herein said memory means includes a memory area for storing face value data items representing face values of said various types of coins, and said processing means further includes amount calculating means for calculating a total amount of coins of the type determined, on the basis of the face value represented by a corresponding one of the face value data items stored in said memory means.

7. A data processing apparatus according to claim 1, wherein said weighing means is provided outside a cabinet housing the data processing apparatus.

8. A data processing apparatus comprising:
memory means for storing weight data items representing unit weights of various types of coins and range data items representing allowable variation ranges for the unit weights;
weighing means for weighing coins to detect a total weight thereof; and
processing means, connected to said memory means and said weighing means, for performing processing of the sales transactions; said processing means including:
type determining means for determining a type of each of a plurality of coins to be counted,
number calculating means for calculating a number of coins of the determined type of each of a plurality of coins to be counted, on the basis of the total weight of the coins detected by said weighing means and the unit weight represented by a corresponding one of the weight data items stored in said memory means,
averaging means for dividing the total weight of the coins detected by said weighing means by the calculated number of coins, to obtain an average coin weight, and
checking means for checking that the average coin weight falls within the allowable variation range represented by a corresponding one of the range data items stored in said memory means.

9. A data processing apparatus according to claim 8, wherein said processing means further includes display means for indicating the number of coins calculated by the number calculating means when it is detected that the average weight falls within the allowable variation range.

10. A data processing apparatus according to claim 9, wherein said memory means includes a memory area for storing face value data items representing face values of said various types of coins, and said processing means further includes amount calculating means for calculating a total amount of coins of the type determined, on the basis of the face value represented by a corresponding one of the face value data items stored in said memory means.

* * * * *